United States Patent
Kuehnle et al.

(10) Patent No.: US 9,360,054 B2
(45) Date of Patent: Jun. 7, 2016

(54) FRICTION CLUTCH

(71) Applicant: Schaeffler Technologies GmbH & Co. KG, Herzogenaurach (DE)

(72) Inventors: Michael Kuehnle, Buehl (DE); Toros Guellueck, Lichtenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/264,660

(22) Filed: Apr. 29, 2014

(65) Prior Publication Data

US 2014/0326572 A1  Nov. 6, 2014

(30) Foreign Application Priority Data

May 3, 2013 (DE) .......................... 10 2013 208 158

(51) Int. Cl.
*F16D 13/72* (2006.01)
*F16D 25/0638* (2006.01)
*F16D 25/12* (2006.01)

(52) U.S. Cl.
CPC ............ *F16D 13/72* (2013.01); *F16D 25/0638* (2013.01); *F16D 25/123* (2013.01); *F16D 2300/0214* (2013.01)

(58) Field of Classification Search
None
See application file for complete search history.

(56) References Cited

U.S. PATENT DOCUMENTS

| | | | | |
|---|---|---|---|---|
| 4,540,077 A | * | 9/1985 | Yamamoto et al. | 192/70.12 |
| 2005/0224308 A1 | * | 10/2005 | Hauck et al. | 192/70.12 |
| 2005/0284722 A1 | | 12/2005 | Heinrich et al. | |
| 2008/0128212 A1 | * | 6/2008 | Utzat et al. | 184/11.4 |
| 2009/0152067 A1 | | 6/2009 | Cmich | |
| 2009/0321206 A1 | * | 12/2009 | Guelluek et al. | 192/3.29 |
| 2011/0179782 A1 | * | 7/2011 | Huegel et al. | 60/338 |
| 2011/0192699 A1 | * | 8/2011 | Yazaki et al. | 192/70.12 |
| 2011/0259702 A1 | * | 10/2011 | Sudau et al. | 192/85.23 |

FOREIGN PATENT DOCUMENTS

| | | |
|---|---|---|
| DE | 10 2008 060 577 | 6/2009 |
| EP | 1 610 018 | 12/2005 |
| WO | WO 2012/175064 A1 * | 12/2012 |

* cited by examiner

Primary Examiner — Huan Le
(74) Attorney, Agent, or Firm — Davidson, Davidson & Kappel, LLC

(57) ABSTRACT

A friction clutch including an input side and an output side arranged to rotate, a fluid chamber fillable with a cooling liquid including a first friction partner, a second friction partner, an inner disc carrier coupled to one of the two friction partners radially on the outside, and a compression device having a pressure chamber fillable with a pressure fluid to provide axial compression of the friction partners to generate a torque-locking engagement between the input side and the output side. A deflection device is provided in the fluid chamber wherein the inner disc carrier includes at least one first passage for the cooling liquid to pass through, and the deflection device feeds back at least a first portion of the cooling liquid flowing in a radially outward direction between the friction partners into a radially inward direction to the first passage of the inner disc carrier.

13 Claims, 1 Drawing Sheet

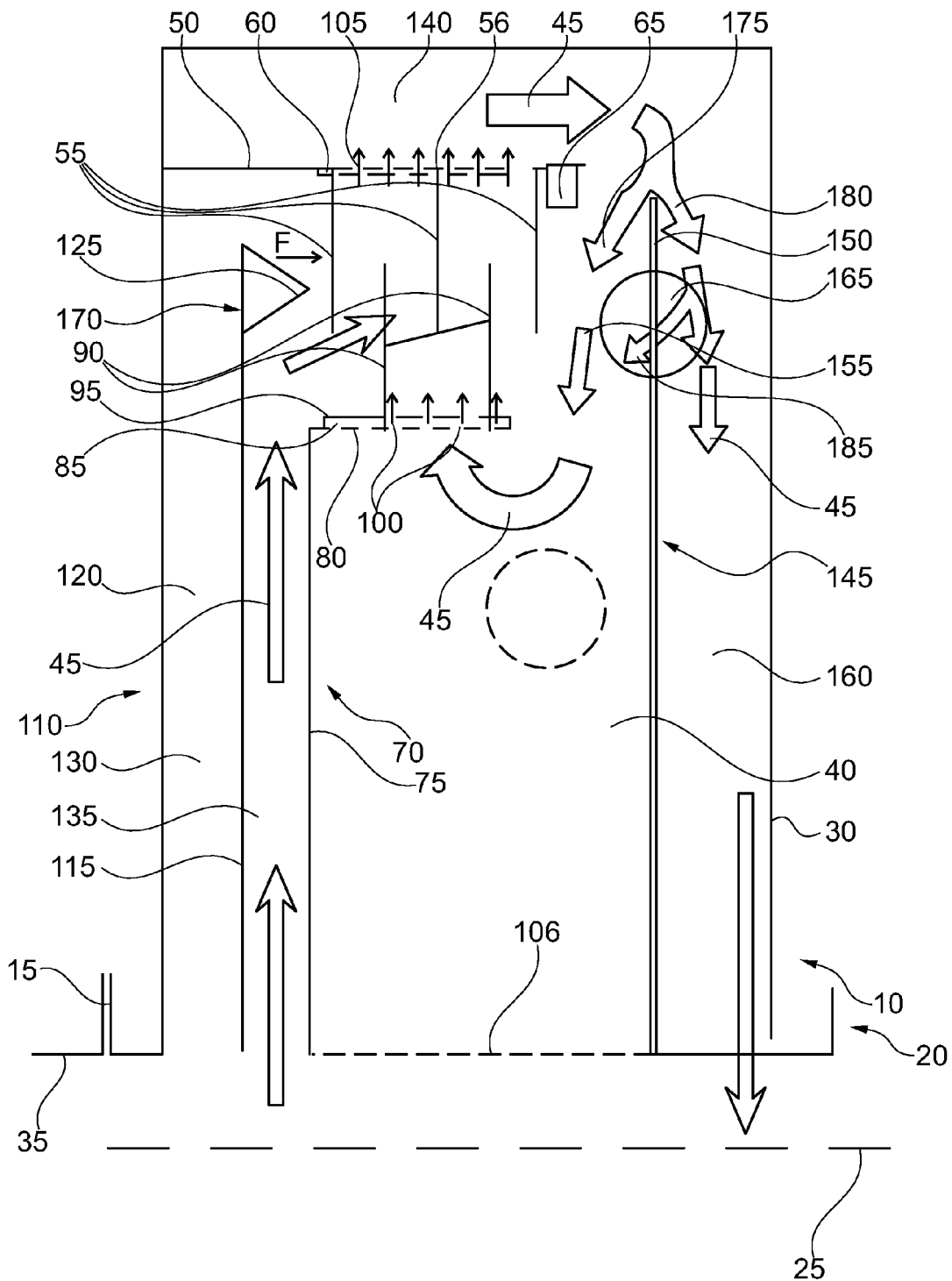

FRICTION CLUTCH

This claims the benefit of German Patent Application DE 10 2013 208 158.8, filed May 3, 2013 and hereby incorporated by reference herein.

The invention relates to a friction clutch comprising an input side and an output side, which are arranged to rotate about an axis of rotation, an fluid chamber fillable with a cooling liquid, the fluid chamber comprising a first friction partner that is axially displaceable and in a torque-locking engagement with the input side, at least one second friction partner that is axially displaceable and in a torque-locking engagement with the output side, at least one inner disc carrier coupled to one of the two friction partners radially on the outside, and a compression device having a pressure chamber fillable with a pressure fluid to provide axial compression of the friction partners to generate a torque-locking engagement between the input side and the output side

BACKGROUND

EP 1 610 018 B1, for example, discloses a friction clutch embodied as a wet-running start-up clutch. The friction clutch comprises an input side and an output side, which are arranged for rotation, as well as an fluid chamber. To transmit a torque between the input side and the output side in a frictional way, first friction discs are provided that are in a torque-locking engagement with the input side and are axially displaceable. Furthermore, second friction discs are provided, which are likewise axially displaceable and are connected to the output side in a torque-locking way. The actuating piston is displaced in an axial direction by a pressure chamber into which a pressure fluid is introduced and compresses the friction discs to establish a torque-locking engagement between the input side and the output side.

Moreover, DE 10 2008 060 577 discloses a torque converter including a friction clutch.

In both cases, the friction clutches are cooled by a cooling liquid provided in a housing of the friction clutch. The cooling liquid absorbs the heat that is generated as the clutch is being engaged to prevent the clutch, in particular the friction discs of the friction clutch, from over-heating.

SUMMARY OF THE INVENTION

It is an object of the present invention to provide a clutch with improved cooling, i.e. an improved heat removal from the friction discs.

In accordance with the invention, an improved friction clutch comprises an input side and an output side, which are arranged for rotation about an axis of rotation, and an fluid chamber that is fillable with a cooling liquid, wherein a first friction partner that is displaceable in an axial direction and in torque-locking engagement with the input side and at least one second friction partner that is displaceable in an axial direction and in torque-locking engagement with the output side are provided in the fluid chamber. In addition, at least one inner disc carrier coupled radially on the outside to one of the two friction partners and a compression device including a pressure chamber fillable with a pressure fluid are provided in the fluid chamber to achieve axial compression of the friction partners to create a torque-locking engagement between the input side and the output side. Moreover, a deflection device is provided in the fluid chamber, the deflection device in particular arranged axially adjacent to the inner disc carrier. The inner disc carrier includes at least one first passage for the cooling liquid to pass through the inner disc carrier. The deflection device is designed to feed back at least a first portion of the cooling liquid flowing in a radially outward direction between the friction partners in a radially inward direction to the first passage of the inner disc carrier.

In this way, direct circulation of the cooling liquid is provided at the friction partners, reliably ensuring improved cooling of the friction partners. In addition, after-cooling is achieved while the clutch is in an engaged condition so that the friction partners have already been sufficiently cooled for a reengagement. Thus the total thermal stress on the friction partners in the friction clutch may reliably be maintained on a low level and the friction clutch may absorb higher start-up torques. Thus the friction clutch on the whole may transmit a higher torque even though its weight and installation space remain the same.

In accordance with a further embodiment of the invention, the inner disc carrier has a toothed section arranged in an axial direction and an attachment section arranged in a radial direction. The passage is arranged in the toothed section. The toothed section is designed to provide a form-locking or positive connection between the first and second friction partners. Furthermore, the toothed section is located radially outward and is connected to the attachment section on the side of the toothed section that is opposite the deflection device. In addition, internal circulation is not hampered or even blocked by the attachment region of the inner disc carrier. Moreover, it is no longer necessary to provide recesses in the attachment section of the inner disc carrier to ensure an internal circulatory volume flow.

In accordance with a further embodiment, a feed channel is provided in the axial direction between the compression device and the inner disc carrier. The feed channel is designed to guide the cooling liquid from the inside in a radially outward direction to the first and/or second friction partner. In this way, additional cooled-down cooling liquid may be directly fed to the friction partners to improve cooling. In addition, the cooling oil fed into the clutch housing from outside the clutch housing replaces the heated oil already present in the housing, causing the oil in the clutch to be continuously exchanged or to be exchanged as required as portion of an external coolant circuit. The aforementioned option of being able to avoid recesses in the attachment section allows the formation of an essentially fluid-tight feed channel between the attachment region of the inner disc carrier and the clutch piston, providing a targeted and effective way of supplying external cooling liquid, in particular cooling oil, to a disc package formed by the friction partners. Thus even in a condition in which the internal circulation largely comes to a halt due to identical rotary speeds on the drive side and on the power take-off side (e.g. when the clutch is engaged), after-cooling of the disc arrangement is ensured.

In accordance with a further embodiment, the friction clutch includes a housing that separates the fluid chamber from an environment. The fluid chamber further includes an outer disc carrier that has at least one second passage and is coupled radially on the inside to the other one of the two friction partners. A collection channel designed to collect the cooling liquid that flows between the friction partners and passes through the outer disc carrier via the second passage in a radially outward direction is provided between the outer disc carrier and the housing. In this way, a complete radial flow through the entirety of the friction partners is ensured.

The flow through the disc package formed by the friction discs is especially increased by providing the friction discs that are fixed for co-rotation to the drive side with fluid-enhancing structures such as grooves or recesses that are suitable for accelerating the cooling liquid flowing into the clutch package in a circumferential direction to achieve a pumping effect of the cooling oil over the friction surfaces of the clutch due to centrifugal forces.

In accordance with a further embodiment, the collection channel is arranged to circumferentially run around the outer disc carrier and aligned to be essentially parallel to the axis of rotation. In this way, a reliable axial flow of the cooling liquid in the direction of the deflection device is ensured.

In accordance with a particularly advantageous embodiment, the deflection device may comprise a guide portion designed to divide the cooling liquid flowing out of the collection channel into a first portion and a second portion of cooling liquid.

In accordance with a further embodiment, the guide portion of the deflection device and the first and/or second friction partner facing the guide portion define a first feed-back channel, which connects the first passage of the inner disc carrier to the collection channel to guide the first portion of the cooling liquid directly from the collection channel to the first passage of the inner disc carrier.

In accordance with a further embodiment, the deflection device and the housing define a second feed-back channel in the axial direction, the second feed-back channel extending in a radially inward direction further outwards and connected to the collection channel. The second feed-back channel guides the second portion of the cooling liquid in a radially inward direction. In this way, reliable cooling and lubrication of components located further radially inward and for example integrated into the deflection device, for example, such as a centrifugal pendulum-type absorber, a spring damper, or a double-spring damper, may be achieved by the second portion of the cooling liquid.

In accordance with a particularly advantageous embodiment, the deflection device may be connected for co-rotation to the power take-off side of the clutch and during the engagement of the clutch the deflection device may have a rotary speed difference relative to the discs that are fixed for co-rotation with the drive side (engine) and are equipped with fluid-enhancing structures, the speed difference generating a cooling oil circulation in the clutch housing that encompasses the largest possible portion of the clutch housing.

As a result of this cooling liquid circulation, thermal energy is discharged from the disc package and transferred to the other components of the clutch (clutch housing, potentially torsional vibration damper etc.) and most notably stored in the volume of cooling liquid.

In this process, both an amount of cooling liquid included in the clutch housing by the cooling liquid circulation internal to the clutch housing and the components encompassed by the cooling liquid circulation may be used as buffers for the thermal loss caused by the engagement of the clutch, reducing the friction surface temperatures in the disc package to a considerable extent in the case of clutch engagement processes, in particular successive clutch engagement processes that occur multiple times within a short period of time.

In accordance with a further embodiment, on an end face facing the friction partners, the compression device includes a further deflection device that is at least partially arranged radially inward relative to the friction partner facing the compression device and is designed to deflect the cooling liquid flowing out of the feed channel towards the first or second friction partner and to feed it directly to the first or second friction partner.

In accordance with a further embodiment, the deflection device comprises at least one centrifugal pendulum-type absorber in connection with a spring damper or a double-spring damper or, alternatively a spring damper or a double-spring damper. In this way, a particularly compact friction clutch may be provided, allowing the spring damper, the dual spring damper and/or the centrifugal pendulum-type absorber to be simultaneously cooled and lubricated by the second portion of the cooling liquid.

BRIEF DESCRIPTION OF THE DRAWINGS

The invention will be explained in more detail below based on a drawing.

FIG. 1 is a diagrammatic longitudinal sectional view of a friction clutch.

DETAILED DESCRIPTION

FIG. 1 is a diagrammatic longitudinal sectional view of a friction clutch 10. The friction clutch 10 comprises an input side 15 and an output side 20, which are arranged for rotation about an axis of rotation 25. The friction clutch 10 further comprises a housing 30, connected at the input side to a drive train 35 on the left-hand side of FIG. 1. The drive train 35 may be a combustion engine, a hybrid drive, or an electric motor. On the inside, the housing 30 includes a fluid chamber 40 sealed against the environment of the friction clutch 10 by the housing 30. Thus a cooling liquid 45 present in the fluid chamber 40 remains in the housing 30. The housing 30 is arranged for co-rotation with an outer disc carrier 50. A plurality of first friction discs 55 is arranged radially inward on the outer disc carrier 50. The first friction discs 55 have an outer toothing 56. The outer disc carrier 50 has an interior toothing 60 meshing with the outer toothing 56 of the first friction disc 55. As first friction partners, the first friction discs 55 are thus axially displaceable and arranged for co-rotation with the outer disc carrier 50 in a form-locking way via the interior toothing 60 of the outer disc carrier 50. The outer disc carrier 50 further comprises a stop 65. The stop 65 is arranged axially adjacent to the first friction discs 55. In this way, the first friction discs 55 are connected to the input side 15 in a torque-locking way.

An inner disc carrier 70 is provided radially inward relative to the outer disc carrier 50. The inner disc carrier 70 includes an attachment region 75 and a toothing region 80. The attachment region 75 is radially outwardly connected to the toothing region 80. The toothing region 80 comprises an outer toothing 85. Multiple second friction discs 90 are arranged radially to the outside on the inner disc carrier 70. Radially to the inside, each of the second frictions discs 90 has an interior toothing 95 that meshes with the outer toothing 85 of the inner disc carrier 70 so that as second friction partners, the second friction discs 70 are connected to co-rotate with the inner disc carrier 70, yet are axially displaceable in the axial direction on the outer toothing 85 of the inner disc carrier 70. In the toothing region 80, the inner disc carrier includes a plurality of first passages 100. In a similar way, the outer disc carrier 50 includes a plurality of second passages 105 in the region of the inner toothing 60. The second passages 105 are provided in the region of the inner toothing 50. Radially to the inside, the attachment region 75 of the inner disc carrier 70 is connected to the output side 20 via a hub 106.

A compression device 110 is provided to the left of the inner disc carrier 70. The compression device 110 comprises a piston 115 that delimits a pressure chamber 120 together with the housing 30. A protrusion 125 is provided on the piston 115 on a radial level of the first friction disc 55. When the pressure chamber 120 is actuated and filled with a pressure fluid 130, the piston protrusion 125 acts to contact the front face of the first friction disc 55 and to apply a pressure F to the friction disc 55.

A feed channel 135 extending radially outward from the inside is provided between the inner disc carrier 70, i.e. its attachment region 75, and the piston 115. In the axial direction, the feed channel 135 is delimited by the said piston 115 and by the attachment region 75 of the inner disc carrier 70. Radially to the outside of the outer disc carrier 50, a collection channel 140 is provided. The collection channel 140 is delimited by the outer disc carrier 50 and the housing 30. The collection channel 140 circumferentially runs around the outer disc carrier 50 and is aligned to be essentially parallel to the axis of rotation 25. A deflection device 145 is provided axially adjacent to the outer disc carrier 50 and to the inner disc carrier 70, respectively. The deflection device 145 comprises a guide section 150 arranged radially outwardly on the deflection device 145. Together with the friction discs 55, 90, in the axial direction the guide section 150 defines a first feed-back channel 155. To the right of the first feed-back channel 155, the deflection device 145 or rather the guide section 150 and the housing 30 define a second feed-back channel 160. The second feed-back channel 160 extends radially inward from outside. The first and second feed-back channels 155, 160 are connected to the collection channel 140.

As an alternative to the embodiment shown in FIG. 1, in a manner analogous to the inner toothing 60, the housing 30 might be provided with an inner toothing on its inner wall in its outer circumferential region. Thus in addition to its function as a container for the oil, the housing 30 might be embodied as an outer disc carrier. In this case, the collection channel would be defined radially to the outside by the outer disc carrier formed on the housing 30 and radially to the inside by the outer diameter of the second friction discs 90 meshing with the inner disc carrier 70. The cooling liquid 45 might then be guided to the deflection device 145 in the axial direction via left-out teeth of the first friction discs 55.

In this embodiment, the deflection device 145 comprises a spring damper 165 symbolically indicated in FIG. 1. Alternatively, it is conceivable for the spring damper 165 to be embodied as a double-spring damper (symbolically indicated by the dashed line). Furthermore the guide section 150 of the deflection device 145 may, for example, be embodied as a centrifugal pendulum-type absorber. Furthermore, instead of the arrangement perpendicular to the axis of rotation 25 as shown in FIG. 1, the guide section 150 may have a contour or may be inclined relative to the axis of rotation 25.

When the pressure chamber 120 is filled with a pressure fluid 130 under pressure, the piston 115 is displaced in the direction of the deflection device 145, causing the friction discs 55, 90 to be pressed against each other. The displacement path of the friction discs 55, 90 is limited by the stop 65, so that an axial compression of the friction discs 55, 90 occurs. This is done to establish a torque-locking connection between the friction discs 55, 90, connecting the input side 15 to the output side 20 in a torque-locking way. When they are being engaged, friction occurs between the friction discs 55, 90, causing the friction discs 55, 90 to be warmed up due to the frictional heat. To discharge this heat, the cooling liquid 45 is provided in the fluid chamber. The cooling liquid 45 flows radially outward from the inside via the feed channel 135. This is achieved due to the fact that the outer disc carrier 50 and the piston 115 are connected to the input side 15 and thus continuously rotate at the input rotary speed when the combustion engine is in operation. This causes the cooling liquid to be accelerated in the radial direction and to be subjected to centrifugal forces that urge the cooling liquid 45 in the feed channel 135 in a radially outward direction. Despite the change in the cross-section of the feed channel 135 when the piston 115 is actuated, the attachment region 75 is spaced a portion from the piston 115 in such a way that even in the actuated condition of the piston 115, the cross-section of the feed channel 135 is large enough to ensure a sufficient flow of cooling liquid 45 through the feed channel 135 to the friction discs 55, 90. The protrusion 125 of the piston forms a further deflection device 170 that axially deflects the cooling liquid 45, which flows in an outward direction, in order directly to supply cooling liquid 45 to the friction discs 55, 90. The cooling liquid 45 directly flows between the first and second friction discs 55, 90. Then the cooling liquid 45 flows further radially outward and passes through the second passages 105 in the outer disc carrier 50. The cooling liquid 45 is collected by the collection channel 140 radially on the outside of the outer disc carrier 50 and is guided away from the outer disc carrier 50 in an axial direction in the direction of the deflection device. Radially on the outside of the deflection device 145 the housing 30 deflects the cooling liquid 45 radially inward in the direction of the guide section 150. The guide section 150 divides the flow of cooling liquid coming from the outer disc carrier 50 into a first portion 175 and a second portion 180. The first portion 175 of the cooling liquid 45 flows to the left and into the first feed-back channel 155 in a radially inward direction. The first feed-back channel 155 ends radially on the inside at the level of the inner disc carrier 70. Radially to the inside of the toothed region 80, the cooling liquid is attracted by a suction effect created by the cooling liquid 45 that flows away between the friction discs 55, 90. The cooling liquid 45 that is located radially inward of the toothed region 80 passes through the first passages 100 in the toothed region 80 again to flow in a radially outward direction between the friction discs 55, 90. The newly entered cooling liquid 45 leaves the region of the friction discs 55, 90 radially to the outside via the second passages 105 of the outer disc carrier 50, completing the circuit for the first portion 175 of the cooling liquid 45. The second portion 180 of the cooling liquid flows to the right between the deflection device 145 and the housing 30 in a radially inward direction via the second feed-back channel. The second portion 180 of the cooling liquid 45 cools the spring damper 165. Depending on the design of the spring damper 165, a portion 185 of the second portion 180 of cooling liquid 45 passes into the first feed-back channel 155 via the spring damper 165 an follows the first portion 175 in the circuit of cooling liquid 45 described above. The remaining portion of the second portion 180 of cooling liquid 45 continues through the second feed-back channel 160 or, in an alternative embodiment, flows in a radially inward direction on both sides of the deflection device 145. Having reached the radial inside, the remaining portion of the second portion 180 of cooling liquid 45 flows axially along the hub 106 to the feed channel 135 via an optional first external cooling device arranged outside the friction clutch 10 and an optional external fluid pump to complete the cooling liquid circuit.

The direct circulation of the cooling liquid 45 from the collection channel 140 via the first feed-back channel 155 towards the passages 100 in the disc carrier 70 results in a particularly efficient cooling of the friction discs 55, 90. Especially if there is a rotary speed difference between the input side 15 and the output side 20, for example when the vehicle starts to move, a particularly strong flow of cooling liquid through the friction discs 55, 90 may be generated. The flow of cooling liquid 45 at the friction discs 55, 90 may additionally be improved by providing inclined or radial grooves on the friction discs 55, 90. In accordance with a particularly advantageous aspect, the aforementioned grooves may be provided in the friction discs that are connected to the input side 15 of the friction clutch 10 (in the illustrated embodiment the first friction discs 55). In this way, in particular at the maximum rotary speed difference, i.e. when the input side 15 rotates at motor speed and the power take-off side is at a standstill, a particularly strong flow of cooling liquid passes between the friction discs 55, 90. Moreover, the targeted supply of fresh cooling liquid 45 via the feed channel 135 and the first feed-back channel 155 ensures reliable after-cooling, so that in the engaged condition, the friction discs 55, 90 continue to be cooled to attain a particularly low starting temperature at the friction discs 55, 90 for the next engagement cycle.

The circulation of the cooling liquid 45 in the cooling circuit is interrupted as little as possible if the attachment region 75 is arranged on the side of the toothed region 80 opposite the deflection device 145. The resultant cup shape of the inner disc carrier 70 is open to the cooling liquid 45 coming from the first feed-back channel 155. Alternatively, it is conceivable for the attachment region 75 to be arranged on the toothed region 80 to be parallel and adjacent to the deflection device 145. To allow circulation of the cooling liquid in the way described above, the attachment region 75 has numerous passages through which the first cooling liquid 45 coming from the first feed-back channel 155 may flow to the toothed region 80 and to the first passages 100, respectively.

An advantage of the design described above is that no further components such as nonreturn valves are necessary for the circulation of the cooling liquid 45. Moreover, there is no influence on the forces, in particular in the axial direction, of the piston 115 or a centrifugal-oil cover that may usually be arranged between the attachment region 75 and the piston 115. In addition, although the installation space of the assembly is the same, more space is available for the spring damper 165, which may be more complex as a result.

In the illustrated embodiment, the inner disc carrier 70 has an L-shaped cross section. It is to be understood that other cross-sectional shapes are possible. For example, the attachment region 75 might be arranged in the toothed region 80, resulting in a T-shaped cross section of the inner disc carrier 70. It is also conceivable for the attachment region 75 to be inclined relative to the axis of rotation 25 instead of perpendicular to the axis of rotation 25.

In the embodiment of FIG. 1, the outer disc carrier 50 is connected to the input side 15 and the inner disc carrier 70 is connected to the output side 20. Alternatively, it is conceivable for the inner disc carrier 70 to be connected to the input side 15 (engine) and for the outer disc carrier 50 to be connected to the output side 20.

In accordance with a further embodiment, the inner disc carrier 70, together with the housing 30, might be connected for co-rotation to the input side 15 or coupled via a torsional vibration damper and on the output side, the outer disc carrier 50 might be coupled to the transmission input shaft of a transmission that follows in the drive train of the friction clutch 10. In a further alternative embodiment, the outer disc carrier 50 might be connected to the transmission input shaft by means of the deflection device.

LIST OF REFERENCE NUMERALS 10 friction clutch
15 input side
20 output side
25 axis of rotation
30 housing
35 drive train
40 fluid chamber
45 cooling liquid
50 outer disc carrier
55 first friction disc
56 outer toothing
60 inner toothing
65 stop
70 inner disc carrier
75 attachment region
80 toothed region
85 outer toothing
90 second friction disc
95 inner toothing
100 first passage
105 second passage
106 hub
110 compression device
115 piston
120 pressure chamber
125 protrusion of the piston
130 pressure fluid
135 feed channel
140 collection channel
145 deflection device
150 guide section
155 first feed-back channel
160 second feed-back channel
165 spring damper
170 further deflection device
175 first cooling liquid portion
180 second cooling liquid portion
185 further cooling liquid portion

What is claimed is:
1. A friction clutch comprising:
an input side and an output side arranged to rotate about an axis of rotation;
a fluid chamber fillable with a cooling liquid, the fluid chamber including a first friction partner axially displaceable and in a torque-locking engagement with the input side, at least one second friction partner axially displaceable and in a torque-locking engagement with the output side, at least one inner disc carrier coupled to one of the first and second friction partners radially on the outside, a compression device having a pressure chamber fillable with a pressure fluid to provide axial compression of the friction partners to generate a torque-locking engagement between the input side and the output side, and a deflection device,
the inner disc carrier including at least one first passage for the cooling liquid to pass through, and the deflection device embodied to feed back at least a first portion of the cooling liquid flowing in a radially outward direction between the first and second friction partners into a radially inward direction to the first passage of the inner disc carrier, the first portion passing axially between deflection device and the first and second friction partners,
further comprising a housing delimiting the fluid chamber relative to an environment, an outer disc carrier arranged in the fluid chamber and having at least one second passage, wherein the outer disc carrier is coupled radially on the inside to the other one of the first and second friction partners and wherein a collection channel is provided between the outer disc carrier and the housing, the collection channel embodied to collect the cooling fluid flowing between the friction part- ners and passing through the outer disc carrier in a radially outward direction via the second passage.

2. The friction clutch recited in claim 1 wherein the inner disc carrier includes a toothed region arranged in the axial direction and an attachment region extending in the radial direction, wherein the passage is arranged in the toothed region, the toothed region embodied to provide a positive connection with one of the first and second friction partners, and the toothed region being connected to the attachment region on the side of the toothed region opposite the deflection device.

3. The friction clutch recited in claim 1 wherein between the compression device and the inner disc carrier a feed channel is provided in the axial direction, the feed channel embodied to guide the cooling liquid radially from the inside to the outside to the first or second friction partner.

4. The friction clutch recited in claim 1 wherein the collection channel is arranged to extend circumferentially around the outer disc carrier and aligned essentially in parallel with the axis of rotation.

5. The friction clutch recited in claim 1 wherein on an end face facing the first and second friction partners, the compression device has a further deflection device arranged at least partly radially inward relative to the first or second friction partner facing the compression device and is embodied to deflect the cooling liquid flowing out of a feed channel and to directly feed the cooling liquid to the first or second friction partner.

6. The friction clutch recited in claim 1 wherein the deflection device includes a spring damper.

7. The friction clutch as recited in claim 1 wherein the deflection device is arranged axially adjacent to the inner disc carrier.

8. The friction clutch as recited in claim 1 wherein the deflection device divides the cooling liquid flowing in the radially outward direction between the first and second friction partners into the first portion and into a second portion, the second portion passing in the radially inward direction and passing axially on a side of the deflection device opposite the first and second friction partners.

9. The friction clutch recited in claim 1 wherein the deflection device includes a guide section embodied to divide the cooling liquid flowing out of the collection channel into the first portion and a second portion of cooling liquid.

10. The friction clutch recited in claim 9 wherein the guide section of the deflection device and the first or second friction partner facing the guide section define a first feed-back channel, the first feed-back channel connecting the first passage of the inner disc carrier to the collection channel to guide the first portion of the cooling liquid from the collection channel directly to the first passage of the inner disc carrier.

11. The friction clutch recited in claim 10 wherein the deflection device and a housing in the axial direction define a second feed-back channel, the second feed-back channel embodied to extend radially from the inside to the outside and connected to the collection channel and the second feed-back channel embodied to guide the second portion of the cooling liquid radially inward.

12. A friction clutch comprising:
an input side and an output side arranged to rotate about an axis of rotation;
a fluid chamber fillable with a cooling liquid, the fluid chamber including a first friction partner axially displaceable and in a torque-locking engagement with the input side, at least one second friction partner axially displaceable and in a torque-locking engagement with the output side, at least one inner disc carrier coupled to one of the first and second friction partners radially on the outside, a compression device having a pressure chamber fillable with a pressure fluid to provide axial compression of the friction partners to generate a torque-locking engagement between the input side and the output side, and a deflection device,
the inner disc carrier including at least one first passage for the cooling liquid to pass through, and the deflection device embodied to feed back at least a first portion of the cooling liquid flowing in a radially outward direction between the first and second friction partners into a radially inward direction to the first passage of the inner disc carrier, the first portion passing axially between deflection device and the first and second friction partners
wherein the deflection device divides the cooling liquid flowing in the radially outward direction between the first and second friction partners into the first portion and into a second portion, the second portion passing in the radially inward direction and passing axially on a side of the deflection device opposite the first and second friction partners.

13. A friction clutch comprising:
an input side and an output side arranged to rotate about an axis of rotation;
a fluid chamber fillable with a cooling liquid, the fluid chamber including a first friction partner axially displaceable and in a torque-locking engagement with the input side, at least one second friction partner axially displaceable and in a torque-locking engagement with the output side, at least one inner disc carrier coupled to one of the first and second friction partners radially on the outside, a compression device having a pressure chamber fillable with a pressure fluid to provide axial compression of the friction partners to generate a torque-locking engagement between the input side and the output side, and a deflection device,
the inner disc carrier including at least one first passage for the cooling liquid to pass through, and the deflection device embodied to feed back at least a first portion of the cooling liquid flowing in a radially outward direction between the first and second friction partners into a radially inward direction to the first passage of the inner disc carrier, the first portion passing axially between deflection device and the first and second friction partners
wherein the inner disc carrier includes a toothed region arranged in the axial direction and an attachment region extending in the radial direction, wherein the passage is arranged in the toothed region, the toothed region embodied to provide a positive connection with one of the first and second friction partners, and the toothed region being connected to the attachment region on the side of the toothed region opposite the deflection device.

\* \* \* \* \*